(12) United States Patent
Lallier et al.

(10) Patent No.: US 12,011,888 B2
(45) Date of Patent: *Jun. 18, 2024

(54) METHOD AND SYSTEM FOR PRODUCING A REINFORCING BAR, AND RESULTING REINFORCING BAR

(71) Applicant: Pultrall Inc., Thetford Mines (CA)

(72) Inventors: Alexandre Lallier, Thetford Mines (CA); Danny St-Cyr, Thetford Mines (CA)

(73) Assignee: Pultrall Inc., Thetford Mines (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,464

(22) Filed: Mar. 27, 2023

(65) Prior Publication Data

US 2023/0294373 A1    Sep. 21, 2023

Related U.S. Application Data

(63) Continuation of application No. 16/463,485, filed as application No. PCT/CA2017/051401 on Nov. 23, 2017, now Pat. No. 11,613,086.

(Continued)

(51) Int. Cl.
*B29C 70/52*    (2006.01)
*B29C 35/02*    (2006.01)
(Continued)

(52) U.S. Cl.
CPC ........ *B29C 70/525* (2013.01); *B29C 35/0277* (2013.01); *B29C 35/10* (2013.01);
(Continued)

(58) Field of Classification Search
CPC ... B29C 35/0277; B29C 35/10; B29C 70/025; B29C 70/521
See application file for complete search history.

(56) References Cited

U.S. PATENT DOCUMENTS

| 2,871,911 | A | 2/1959 | Brandt et al. |
| 4,168,194 | A | 9/1979 | Stiles |

(Continued)

FOREIGN PATENT DOCUMENTS

| CA | 2596911 A1 | 2/2008 |
| CA | 2746281 A1 | 1/2013 |

(Continued)

*Primary Examiner* — Nahida Sultana
*Assistant Examiner* — Irak Nguon
(74) *Attorney, Agent, or Firm* — Woodard, Emhardt, Henry, Reeves & Wagner, LLP (57) ABSTRACT

A method for producing a reinforcing bar by pultrusion, the method comprising the steps of: a) providing a source of fibres; b) assembling the fibres into a bundle; c) impregnating the bundle with a thermosetting resin; d) eliminating excess resin from the bundle; e) compressing the bundle in a centripetal manner; f) exposing the bundle to a radiant energy source; g) spraying particles onto a surface of the bundle; and h) exposing the bundle to radiation in order to initiate, on the surface of same, the polymerisation of the resin. The present invention also concerns a system provided with corresponding devices in order to be able to implement the method. The present invention also concerns a reinforcing bar obtained with the described method and/or system.

20 Claims, 3 Drawing Sheets

Related U.S. Application Data (60) Provisional application No. 62/426,022, filed on Nov. 23, 2016.

(51) Int. Cl.
  *B29C 35/08* (2006.01)
  *B29C 35/10* (2006.01)
  *B29C 70/02* (2006.01)
  *B29C 70/64* (2006.01)
  *E04C 5/07* (2006.01)

(52) U.S. Cl.
  CPC .......... *B29C 70/025* (2013.01); *B29C 70/521* (2013.01); *B29C 70/64* (2013.01); *E04C 5/07* (2013.01); *B29C 2035/0855* (2013.01); *B29C 2035/0861* (2013.01); *B29K 2995/0072* (2013.01)

(56) References Cited

U.S. PATENT DOCUMENTS

| | | | |
|---|---|---|---|
| 4,673,541 A | 6/1987 | Watanabe et al. | |
| 4,861,621 A | 8/1989 | Kanzaki | |
| 5,362,542 A | 11/1994 | Ozawa | |
| 5,540,797 A * | 7/1996 | Wilson | B29C 70/521 |
| | | | 425/114 |
| 5,626,700 A | 5/1997 | Kaiser | |
| 5,650,220 A | 7/1997 | Greenwood | |
| 5,700,417 A | 12/1997 | Fernyhough et al. | |
| 8,413,396 B2 | 4/2013 | Oliva et al. | |
| 9,149,993 B2 | 10/2015 | Gibson et al. | |
| 2008/0318042 A1* | 12/2008 | Kusek | B29C 70/521 |
| | | | 428/378 |
| 2010/0243316 A1* | 9/2010 | Inderberg | B29C 70/885 |
| | | | 156/244.23 |
| 2012/0204499 A1 | 8/2012 | Brandstrom | |
| 2013/0239503 A1* | 9/2013 | Miller | C04B 20/1029 |
| | | | 428/377 |
| 2015/0204075 A1 | 7/2015 | Tsukamoto | |
| 2016/0089820 A1 | 3/2016 | Schinkinger | |
| 2018/0304561 A1* | 10/2018 | Delfino | B29C 35/10 |

FOREIGN PATENT DOCUMENTS

| | | | | |
|---|---|---|---|---|
| CA | 2586394 A1 | | 2/2020 | |
| EP | 0199348 A2 | | 1/1991 | |
| GB | 1393756 A | * | 5/1975 | ............ B29C 35/10 |
| GB | 1393756 A | | 5/1975 | |
| JP | H01174691 A | | 7/1989 | |

* cited by examiner

METHOD AND SYSTEM FOR PRODUCING A REINFORCING BAR, AND RESULTING REINFORCING BAR

REFERENCE TO RELATED APPLICATIONS

This application is a continuation of U.S. patent application Ser. No. 16/463,485, filed Jul. 10, 2020, which is hereby incorporated by reference. U.S. patent application Ser. No. 16/463,485, filed Jul. 10, 2020, is a national stage of International Patent Application Number PCT/CA2017/051401, filed Nov. 23, 2017, which are hereby incorporated by reference. International Patent Application Number PCT/CA2017/051401, filed Nov. 23, 2017, claims the benefit of U.S. Patent Application No. 62/426,022, filed Nov. 23, 2016, which are hereby incorporated by reference.

FIELD OF THE INVENTION

The present invention relates to a method and a system for producing a reinforcement bar. More particularly, the present invention relates to a method and a system for producing a reinforcement bar by a modified process of pultrusion, and also relates to a reinforcement bar resulting from said method and from said system. The present invention also relates to a kit with components destined for carrying out the method and/or for producing the resulting reinforcement bar, and to corresponding methods of assembling, operating and use associated thereto.

DESCRIPTION OF THE PRIOR ART

Means for producing reinforcement bar are well known in the art.

Indeed, it Is well known that the reinforcement of concrete requires the presence of reinforcement bars. These bars are traditionally made of steel. The disadvantage of this material is that corrosion is, in certain conditions, capable of weakening the rods. To compensate this type of problem, reinforcement rods using materials capable of resisting corrosion have been developed. These rods of composite materials are mainly produced by means of pultrusion.

One of the first patents having as a subject the manufacturing of profiles of uniform section by the technique of pultrusion is U.S. Pat. No. 2,871,911 (SHUTTLEWORTH). The process consists mainly in saturating fibers with liquid resin, passing these saturated fibers into two successive spinnerets, a compression spinneret, and another spinneret capable of producing a field of radio waves. The heating of the fibers saturated with liquid thermosetting resin is assured by this second spinneret which enables to execute the main step of polymerization. A heating supplement may be brought by the combustion of a gas if required to obtain a higher rate of polymerisation.

For each change of diameter of rod that must be produced, two expensive spinnerets, having the proper diameters, must be installed on the production device that is described.

This production process is able to produce a rod of uniform section having a good mechanical resistance and a good geometrical precision. However, given that the production process is general and that it is not specifically meant for the production of reinforcement bars for concrete, the document is silent about the ways under which the rod can be textured so as to be anchored into concrete, etc.

Another method of production is described in U.S. Pat. No. 4,168,194 (STILES) which shows us how it is possible, without the use of spinneret, to produce a rod made with the aid of glass fibers and of a liquid thermosetting resin. The device enables to limit the flow of resin, which is not contained by the presence of a spinneret, by controlling the viscosity of the resin by provoking a series of partial polymerizations with the aid of a series of sequential radiant ovens. The partial polymerization, which increases the viscosity of the liquid at each step, is done on a bundle where the fibers become successively more and more close together and which finally form a compact rod. The advantage of this method is that there are no spinnerets. Once again in this case, the method is general and is not meant specifically for the production of reinforcement bars for concrete. The disadvantage of this method originates from the complexity of the elements that bring the fibers closer to each other at each step. During a replacement of the filaments, the re-threading becomes a tedious task.

The polymerization triggered with the aid of ultraviolet radiation is, in the field of pultrusion, shown in U.S. Pat. No. 4,861,621 (KANZAKI) which uses a spinneret transparent to the ultraviolet radiation in order to thus enable to compress the bundles of fibers and at the same time initiate the polymerization thanks to an illumination of the matrix by means of an source of ultraviolet light. The polymerization starts in the spinneret and propagates itself from the surface to the core of the rod. This method has the disadvantage of requiring a complex spinneret, made with a transparent material and provided with sources of lightings. Once again, for each diameter of rod to be produced, it is necessary to install a spinneret of proper dimension.

The use of consolidations threads, taught by the patent of the Applicant of the present case, CA 2,746,281 (ST-CYR et al.), shows under which means it is possible to produce a rod without the use of a spinneret. In this patent, it is shown how a bundle of fibers saturated with liquid resin passes through an oven so that the resin may polymerize. Threads, that sheath the rod, are wound immediately after the step of saturation. These consolidation threads enable to retain the bundles of fibers while the resin that soaks passes, under the effect of the polymerization carried out in the oven from a liquid state to a solid state. In this method, the consolidation threads retain the filaments of the bundle but do not compress it, at least, not in a significant manner. The compression is in fact assured by a constriction ring that removes excess resin by bringing the fibers of the bundle together.

The necessity of producing an anchoring of the reinforcement rods into the concrete has given rise to various solutions such as the texturing of the surface with the aid of mechanical means, the addition of notches on the surface of the rod, as shown in U.S. Pat. No. 5,362,542 (OAZAWA et al.), of threads of important diameters being twisted and glued or even affixing on the surface a second material of thermoformable polymer and molded with striations or asperities, see U.S. Pat. No. 5,626,700 (KAISER).

The texturing by striation has the disadvantage, for a rod made of composite materials, to undulate the filaments of the bundle. This deviation of the fibers away from the axis of the rod decreases its mechanical resistance. Relying on the use of a striations or notches for ensuring a good anchoring decreases greatly the resistance of the rod by cutting a portion of the fibers of the bundle. The putting in place of twisted threads of great diameter, see U.S. Pat. No. 9,149,993 (GIBSON), has the disadvantage of producing a sequence of compression points and thus in turn undulates the fibers of the bundle and thus decreases its mechanical resistance.

The use of particles, and more particularly of sand, is known and been used for a long time by the Applicant of the present case, another example is given by document CA 2,586,394 (BRANDSTROM). In practice, it is generally necessary to put an adhesive resin prior to the pulverization of the sand at the surface of the rod which has as a disadvantage the necessity of having to call upon an additional step.

The method of producing reinforcement rods has an influence in the capacity of producing rods with a good geometrical precision. It is indeed useful to be able to assemble rods between them by means of sleeves and other fastening accessories. These sleeves and fasteners benefit greatly from being able to adjust themselves in rods having a diameter not varying too much, see U.S. Pat. No. 8,413,396 (OLIVA and al.).

In view of the above, it would be very useful to be able to provide a new method for producing a reinforcement bar which would offer solutions to the disadvantages and/or drawbacks associated with conventional methods known, such as those described previously, for example.

SUMMARY OF THE INVENTION

An object of the present invention is to provide a method for producing a reinforcement bar which, by virtue of its design and steps/components, satisfies some of the above-mentioned needs, and which is thus an improvement over other related mechanisms, devices and/or methods known in the prior art.

More particularly, an object of the invention is to provide an advantageous method that enables to obtain by a modified process of pultrusion a reinforcement bar for concrete (and/or for any other type of related material, of course).

The above object is achieved, as will be easily understood hereinafter, with a method for producing a reinforcement bar such as the one briefly described in the present description, and such as the one exemplified in the accompanying drawings.

According to one aspect of the present invention, an object is to provide a method for producing a reinforcement bar by a modified process of pultrusion, the method comprising the steps of:
  a) providing a source of filaments;
  b) assembling filaments into a bundle;
  c) impregnating the bundle with a thermosetting resin;
  d) removing excess resin from the bundle;
  e) compressing the bundle in a radial manner;
  f) exposing the bundle to a source of radiant energy;
  g) projecting particles onto the bundle; and
  h) exposing the bundle to a radiation in order to initiate on its surface a polymerization of the resin.

According to another aspect of the present invention, an object is also to provide a system for producing a reinforcement bar by a modified process of pultrusion, the system comprising:
  a device for providing a source of filaments;
  a device for assembling filaments into a bundle;
  a device for impregnating the bundle with a thermosetting resin;
  a device for removing excess resin from the bundle;
  a device for compressing the bundle in a radial manner;
  a device for exposing the bundle to a source of radiant energy;
  a device for projecting particles onto the bundle; and
  a device for exposing the bundle to a radiation in order to initiate on its surface a polymerization of the resin.

According to another aspect of the present invention, an aim is also to provide a product (ex. a reinforcement bar, a reinforcement rod, etc.) produced with the above-mentioned method and/or system, and/or with a corresponding formula, type of filament and/or particular resin.

According to another aspect of the present invention, an aim is also to provide a structure (ex. made of concrete, etc.) provided with at least one product (ex. a reinforcement bar, a reinforcement rod, etc.) produced with the above-mentioned method and/or system.

According to another aspect of the present invention, an aim is also to provide an infrastructure (ex. plant, etc.) for carrying out the above-mentioned method and/or system.

According to another aspect of the present invention, an aim is also to provide a method of operating and/or use of the above-mentioned method and/or system.

According to another aspect of the present invention, an aim is also to provide a kit with components destined to be mounted together for assembling the above-mentioned system and/or infrastructure and/or for carrying out the above-mentioned corresponding method.

According to another aspect of the present invention, an aim is also to provide a set of components for interchanging with components of the above-mentioned kit.

According to another aspect of the present invention, an aim is also to provide a method of assembling components of the above-mentioned kit and/or set.

According to another aspect of the present invention, an aim is also to provide a method of manufacturing either one of the above-mentioned components.

According to another aspect of the present invention, an aim is also to provide a method of doing business with the above-mentioned method and/or system, resulting reinforcement bar, formula, filament, resin, product(s), structure, infrastructure, kit, set and/or other corresponding method(s).

The objects, advantages, and other features of the present invention will become more apparent upon reading of the following non-restrictive description of preferred embodiments of the invention, shown in the accompanying drawings, and given for the purpose of exemplification only.

BRIEF DESCRIPTION OF THE DRAWINGS

FIG. 2 shows a view of the structure of the rods according to three possible steps of the process.

DETAILED DESCRIPTION OF POSSIBLE EMBODIMENTS OF THE INVENTION

In the following description, the same numerical references refer to similar elements. The embodiments (geometries, materials, etc.) illustrated in the figures and the features described in the present patent application are preferred ones only, given for exemplification purposes only.

Moreover, although the present invention was primarily designed for producing a reinforcement rod, such as a reinforcement bar destined for concrete, for example, the invention may be used with any other object, and in other fields, as apparent to a person skilled in the art. Consequently, expressions such as "rod", "bar", "reinforcement", "structure", "concrete", etc., as used herein, and/or any other reference and/or any other equivalent or similar expression should not be considered as limiting the scope of the present invention and include any other object/substitute and/or any other possible application with which the present invention could be used and may be useful, as apparent to a person skilled in the art.

In addition, although the preferred embodiments of the present invention as illustrated in the accompanying drawings comprise various components and features, all of these components are not necessarily essential to the invention, and consequently, should not be taken in their restrictive sense, i.e. should not be taken so as to limit the scope of the present invention. It is to be understood, as also apparent to a person skilled in the art, that other suitable components and geometrical configurations and/or other possible cooperations therebetween could be used for the system according to the present invention, as will be briefly explained hereinbelow, without departing from the scope of the present invention.

Moreover, in the context of the present invention, expressions such as "rod", "reinforcement", "bar", "structure", "system", "device", "assembly", "kit", etc., as well as any other equivalent expressions and/or compounds word thereof known in the art will be used interchangeably. This applies also for any other mutually equivalent expressions, such as, for example: a) "method", "process", "system", "infrastructure", "plant", etc.; b) "producing", "carrying out", "manufacturing", "assembling", etc.; c) "driving", "transmitting", "transforming", "correcting", "adjusting", "modifying", "altering", etc.; as well as for any other mutually equivalent expressions, pertaining to the aforementioned expressions and/or to any other structural and/or functional aspects of the present invention, as also apparent to a person skilled in the art.

Furthermore, in the context of the present description, it will be considered that all elongated objects have an implicit "longitudinal axis" and/or "centerline", such as the longitudinal axis of a rod, for example, or the centerline of a coiled spring/path, and that expressions such as "connected" and "connectable", or "rotating" and "rotatable", for example, may be interchangeable and are mutually equivalent, in that the present invention also relates to a kit with corresponding components for assembling a resulting fully-assembled and fully-operational system and/or infrastructure for carrying out the present method and/or obtaining any resulting and/or derived product.

Moreover, certain components of the present system(s) and/or steps of the method(s) described in the present patent specification could be modified, simplified, altered, omitted and/or interchanged, without departing from the scope of the present invention, depending on the particular applications which the present invention is designed and/or intended for, and depending also on the desired end results, as briefly exemplified herein and as also apparent to a person skilled in the art.

Indeed, as previously mentioned and broadly described, the present invention, as illustrated in the accompanying figures, relates to a method and/or a system for producing a reinforcement bar. More particularly, the present invention relates to a method for producing a reinforcement bar by a modified process of pultrusion, and also relates to a reinforcement bar resulting from said method and/or said system. The present invention also relates to a kit with components meant to carry out the method and/or for producing the resulting reinforcement bar, as well as to corresponding methods of assembling, operating and use associated thereto.

As can be easily understood by a person skilled in the art when referring to the accompanying figures, and broadly described also, the present invention relates to a method for producing a reinforcement bar by a modified process of pultrusion, and may comprise the following general steps: a) providing a source of filaments, b) assembling filaments into a bundle; c) impregnating the bundle with a thermosetting resin; d) removing excess resin from the bundle; e) compressing the bundle in a radial manner; f) exposing the bundle to a source of radiant energy; g) projecting particles onto the bundle; and h) exposing the bundle to a radiation in order to initiate on its surface a polymerization of the resin.

As previously mentioned also, some and/or several steps of the present method could be modified, simplified, omitted and/or interchanged, without departing from the scope of the present invention, depending on the particular applications for which the present system is designed and/or intended for, and depending also on the desired end results.

For example, according to a particular embodiment, the method for producing a reinforcement bar (ex. for concrete, etc.) may comprise the following steps: a) assembling continuous fibers into a bundle; b) saturating the bundle with a thermosetting resin; c) removing excess resin by passing the bundle into a constrictor ring; d) sheathing with elastic threads under tension said bundle; e) exposing the bundle to a field of radio waves; f) projecting particles (ex. sand) on the surface of the bundle; and g) exposing the bundle to a source of lighting in order to initiate on its surface the polymerization of the resin.

One could also complete the influx of energy necessary to the polymerization with the aid of a convection oven, a radiant oven (ex. including microwaves, etc.), an oven with pulsed air and/or by dielectric heating.

The present invention distinguishes itself from existing methods namely by several important and different innovative (i.e. "new" and "innovative") aspects.

Namely, one of these important innovative aspects, consists to compress the bundle in a "radial" manner (and/or in any other equivalent manner), such as for example, the fact of sheathing with "elastic" threads being "under tension" a bundle of fibers saturated with liquid resin so as to ensure the compression of the latter in a "considerable", "centripetal", and substantially "constant" manner, etc.

The elastic threads can be of circular or rectangular (and/or other) cross-sectional profile and can be constituted of materials capable of deforming themselves elastically with an approximate value of at least 5% (about), but preferably, of at least 15% (about).

The advantage that this important step confers to the invention is that the fibers of the bundle become closer to each other and thus the ratio "mass of fiber/total mass"

increases, which is associated with an increase of mechanical performances for the reinforcement bar and a saving in the use of materials.

Another important innovative aspect of the present method is the fact of exposing the bundle to a source of radiant energy, such as a dielectric heating (ex. using a heating by radio waves, etc.), for provoking, by the effect of an increase of its temperature, a sudden decrease of the viscosity of the liquid thermosetting polymer. This decrease of viscosity, enables the resin, under the effect of the compression of the threads (ex. elastic threads, and/or other equivalent components) to migrate quickly to the surface and to form a layer of uniform thickness. This operation enables namely to obtain several advantages, including two considerable advantages:
1) the layer of liquid resin acts as an adhesive for the setting of particles meant to carry out a mechanical anchoring to the concrete (see following step)—a step of coating of an adhesive is therefore avoided; and
2) the layer of resin forms a "barrier" which protects the fiber against chemical and mechanical attacks from the environment, for example, the attack by the alkali of glass fibers, etc.

It is to be noted that this step of heating by radio wave(s) is optional for rods of small diameter because the time necessary for the resin with the viscosity that it possesses at the step of saturation to migrate over a small distance is sufficient.

Another important innovative aspect of the present method consists to project particles onto the bundle, such as for example, by subjecting the rod covered with the thin layer of liquid to a sprinkling of particles such as sand and/or any other equivalent aggregate. The layer of resin acts as an adhesive, and after the hardening of the latter, a rugged layer on the surface of the rod is formed. This rugged surface is used to anchor the rod into the concrete in which said rod is going to take place.

Another important innovative aspect of the present invention, is to expose the bundle to a radiation in order to initiate on its surface a polymerization of the resin, such as, for example, by subjecting immediately the rod, following its exposure to sanding, to a source of luminous radiation having an appropriate wavelength in order to initiate the reaction of the photo-initiator additive which has been added to the thermosetting resin, etc. It is this photo-initiator which ensures, after its activation by a luminous energy, a polymerization of the resin which is very quick, and provides other resulting advantages.

Namely, during the step of quick hardening, a "rigid sheath" is formed about the bundle, and at least, three advantageous consequences result:
1) this enables to avoid a deformation by escapement of the layer of liquid containing sand which covers the rod and thus to obtain a rod with a good dimensional precision;
2) this enables, consequently to the presence of the rigid sheath thus formed to have a rectilinear rod between the support points necessary to the production of the rod. Hence, the rod produced is rectilinear according to the present method whereas it is deformed according to an arc when produced with conventional methods. Indeed, in a traditional process, the support points would be illustrated by the straining ring and a support point at a location where the resin of the rod has become solid, for example, element (6) of FIG. 1. In the proposed process, the sheath in addition to ensuring a premature rigidity of the rod and thus bringing the initial support point closer, it is also possible to dispose several others because the sheath is sufficiently solid so as to not deform itself on these support points; and
3) this enables, by creating an "envelope" about the rod, to limit the emission of vapor composed of organic matter into the atmosphere and thus to contribute to decrease atmospheric pollution.

Figure 4:
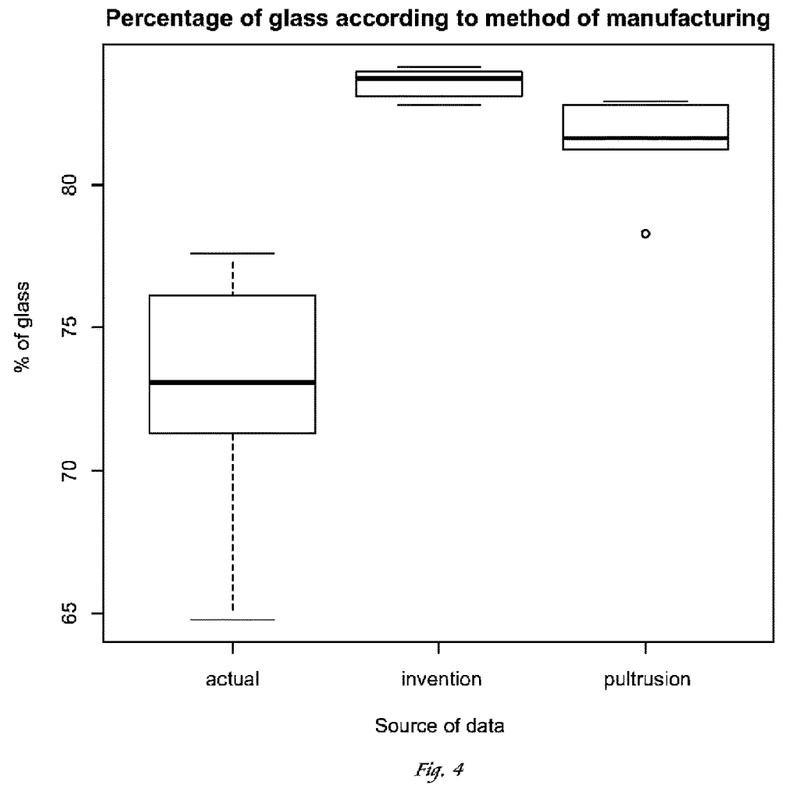
FIG. 4 shows the proportion of glass fibers in the rods produced with the actual method that takes place in the industry, the method proposed by the present invention, and the method which uses the classical process of pultrusion provided with a spinneret.

The present process is also economical, because they bringing together of fibers (ex. glass(es), etc.) under the effect of constriction of threads of the sheath enables to obtain percentages of glass as high as those that can be carried out in the actual state of the art with methods using spinnerets (see FIG. 4). In order to attain the requirements of mechanical resistance, the quantity of material is thus minimized.

The present system is also advantageous in that the production rate is much higher than with conventional methods using spinnerets, because with a spinneret sufficiently long in order to be able to transmit a similar quantity of heat to the process being proposed is associated a friction force such as required for its carrying out which is impracticable.

Furthermore, the dimensional precision of the rod obtained with the present invention is much closer to that obtained with the aid of processes using a spinneret and is much superior, because of the deformations due to the flow of resin to those obtained with the methods without spinneret as they exist.

In the case, of a rod produced with a process using a spinneret, this requires a modified surface, which is always the case for reinforcement rods for concrete that must be anchored into the concrete—one must thus carry out an additional step in order to affix sand onto it, or what is more economical, but also disastrous in light of the mechanical properties, producing transversal striations to the axis of the rod by means of tool-machines.

Furthermore, the present method is also advantageous with respect to conventional methods in that the polymerization of the layer of resin with the aid of luminous radiation, enables to create an "envelope" about the rod. This envelope greatly limits the emission of volatile organic materials during the passage into the oven.

The advantages are brought forth by the greater percentage of the proportion of glass, and by the increase in geometrical precision of the reinforcement bar. The precision of the reinforcement bars enables to use on them fasteners that can be slid, inserted and glued in a solid and reliable manner.

The increase of the proportion of glass also enables to obtain reinforcement bars, which for a specified mechanical resistance, require less resins and are thus more economical.

In short, the resulting product is a reinforcement rod having an excellent mechanical resistance, a high geometrical precision (ex. circularity, etc.) and which is made thanks to a process of high output, which does not require expensive spinnerets and generates minimum volatile organic materials.

Other aspect(s), object(s), embodiment(s), variant(s) and/or advantage(s) of the present invention, all being preferential and/or optional, are briefly summarized hereinbelow.

Indeed, according to a particular embodiment of the present invention, the latter also aims a modified pultrusion process for producing a reinforcement rod of sectional profile (ex. circular, etc.) a for concrete including the following steps: a) continuous impregnating of filaments by a thermosetting resin formula; b) assembling the filament into a bundle; c) compressing the filaments of the bundle with the aid of a constriction device; d) sheathing the bundle saturated with resin with the aid of elastic threads would under tension about the bundle; e) exposing the resin-covered and sheathed bundle to a source of radiant energy capable of provoking a dielectric heating; f) exposing the resin-covered and sheathed bundle to projections of particles destined to provide an anchoring of the rod into the concrete; g) exposing the resin-covered and sheathed bundle to a source capable of initiating a polymerization of the surface of the resin-covered bundle; and h) exposing the bundle to the heat of an oven in order to bring the necessary thermal energy supplement required to obtain a sufficient polymerization of the thermosetting resin.

According to another aspect of the present invention, the latter aims also a formula of thermosetting resin such as the formula be constituted of a thermosetting resin and optionally of a photo-initiator and optionally an additive capable of producing heat when it is exposed to a field of radio wave(s).

According to another aspect of the present invention, the latter also aims a filament having fibers selected from the group consisting of glass fibers, ceramic fibers, basalt fibers, carbon fibers, fibers of metal and of polymers of aramid type or polyester.

According to another aspect of the present invention, the latter also aims a resin (ex. thermosetting, etc.) belonging to the class of acrylic resins, benzoxazine, cyanate ester, vinyl ester, urethane, epoxy, phenolic, polybutadiene, polyimide, polyester, and polyurethane, and/or in a general manner to any other liquid resin capable of being polymerized.

The reading of the following paragraphs, associated to the drawings, will enable to better understand how the different advantages announced and being associated to the technical novelties and different innovative aspects of the invention.

Figure 1:
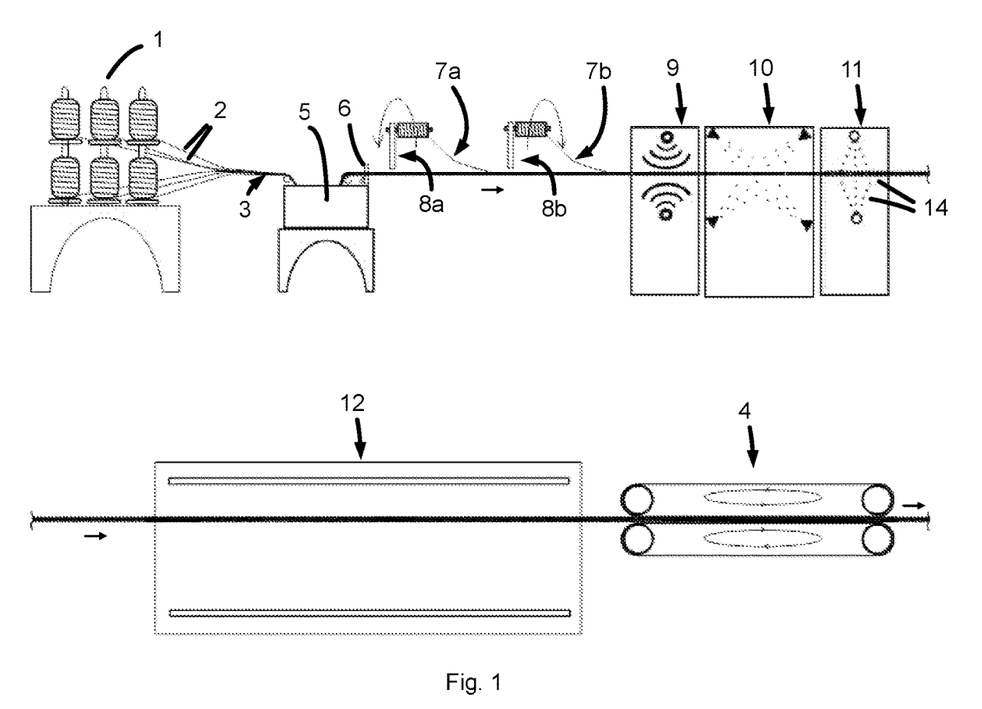
FIG. 1 shows a general schematic view of the system that enables to carry out the method according to a preferred embodiment of the present invention.

Namely, according to preferential and/or optional possible aspects, and when referring to the accompanying figures, the operation of the invention could be explained as follows:

From an array of spools (1), the filaments (2) are unwound from said spools and assembled into a bundle (3). These filaments are often glass fibers but can also be of ceramic, basalt, carbon or even metal (and/or any other appropriate/possible material).

The bundle (3) is pulled, by traction, carried out by the device (4) into a bin (5) which contains a liquid of high viscosity in which the filaments composing the bundle passed through. The bundle therefore becomes, by capillary absorption, saturated. The viscous liquid is often a thermosetting resin of vinyl ester type, but could also be a resin of polyester, epoxy, polyurethane, or of phenolic type (and/or any other appropriate/possible nature). The resin contained in the bundle (3) is strained by passing, always by being pulled by the mechanism (4) through at least one or several rings disposed sequentially (6) which by reducing the diameter of the bundle remove excess resin therefrom.

Immediately, about the bundle (3), at least two elastic threads (7a and 7b) are wound under tension. These threads come from the spools (8a) and (8b) which are mounted on rotating arms which rotate about an axis having the bundle (3) for rotational center. Said elastic threads are wound in a spiral pattern about the axis of the bundle (3), one of the threads being in the dextral direction and the other thread being in the sinistral direction. The thread used, normally a 60 denier nylon monofilament, can be replaced by any other thread consisting of materials capable, under tension, of stretching themselves elastically by at least 5%, but preferably, by at least 15%. It is also possible to replace the threads by bands of woven type or non-woven type under the condition that they be elastic in a manner similar to the thread described above, furthermore, in a case of a band, it must also be of porous nature so that the resin may migrate to the surface. By adjusting the dimensions of the threads, the materials, the tension during winding, as well as the progression of spiral winding, it is possible to influence the mechanical properties of the resulting rod.

Figures 2A, 2B, 2C:
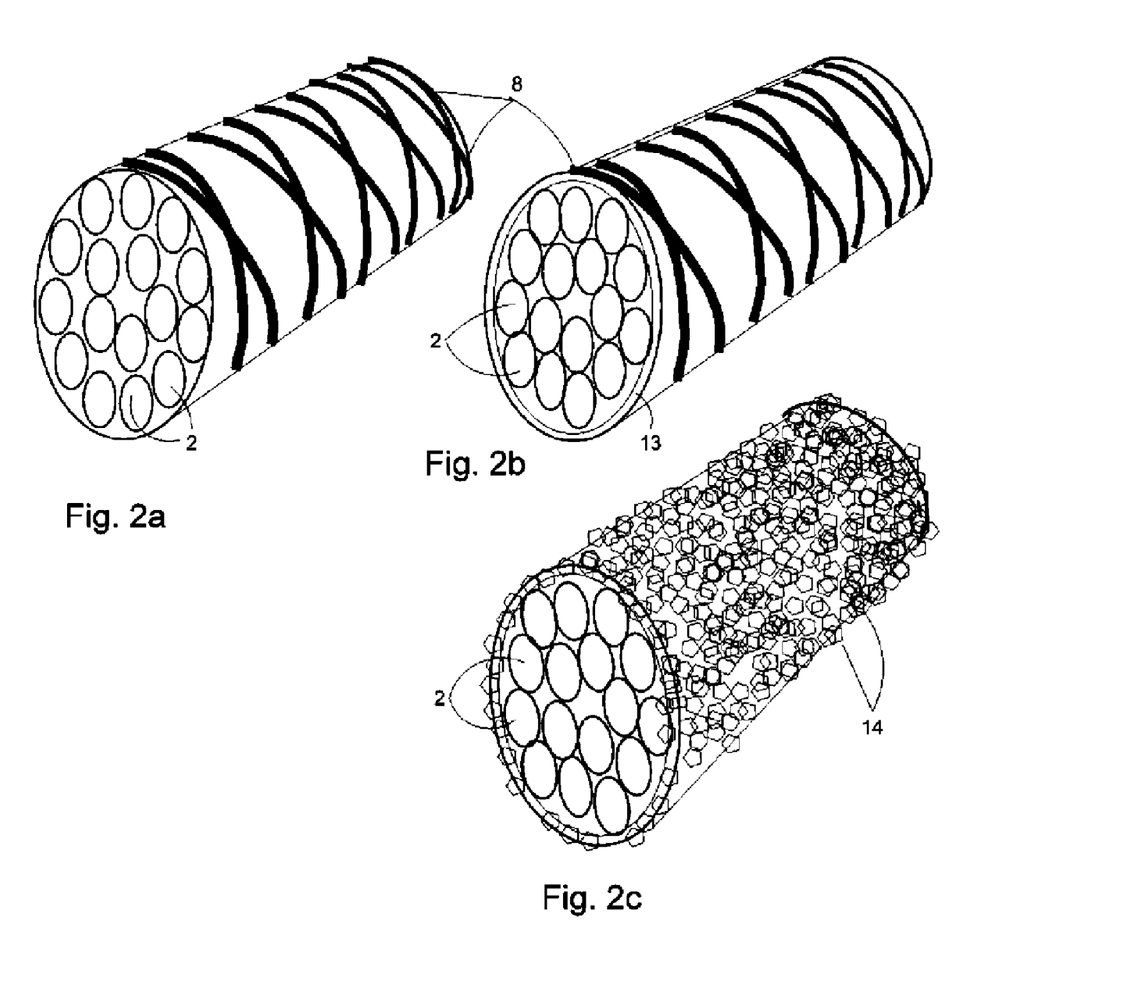
In FIG. 2a, the reinforcement rod is shown in the state that exists immediately after the winding of the elastic threads and before its entry into the facility of exposure to the field of radio frequency(ies).
FIG. 2b shows the rod after its exit from the field of radio frequency(ies).
FIG. 2c shows the rod after its exit from the facility where there has been projection thereon of aggregates. It is to be noted that the elastic threads are no longer visible, because they are under the layer of aggregates.

The resin-covered and sheathed bundle (3), always pulled by the traction due to the mechanism (4) passes into a facility of heating by radio waves (9). The frequency of emission of this device can be in the field of "high frequencies" (1 to 400 MHZ) or can even be in the category of "microwaves" (400 to 18 000 MHZ). This radiation by radio waves, produces a sudden increase of the temperature of the resin. This increase of the temperature is accompanied by a decrease just as sudden of the viscosity of the resin. This decrease of the viscosity, under the effect of the constriction, brought by the elastic threads (7a and 7b) that sheath the bundle (3) result in that the glass fibers become closer to each other and the resin that occupied the space between the fibers is urged away by the pressure and finds itself in a thin layer (13) at the surface of said bundle (see FIG. 2b)

Immediately after the exposure to the source of radio waves, the bundle being resin-impregnated, sheathed and with a thin layer of liquid resin in its surface penetrates, always being pulled by the mechanism (4) into a sanding facility (10) where sand (14) or other similar aggregates are projected onto its surface by jets of air or other means. The resin having migrated to the surface of the rod acts as an adhesive and the aggregates stick to it (see FIG. 2c). The aggregates, often sand particles, can also be replaced by crushed glass, ceramic particles and/or other particles capable of adhering to the selected thermosetting resin.

Immediately, the bundle being resin-impregnated, sheathed and with a thin layer of liquid resin and containing sand on its surface, always being pulled by traction due to the mechanism (4), passes into a lighting facility (11) where are located lamps that emit a light having the wavelength being necessary to provoke the triggering of the photo-initiator incorporated into the mixture of thermosetting resin. The lamps normally emit in the wavelength zone of 200 to 500 nm and they can be of different types such as electroluminescent diodes, metal allide lamps, mercury vapor lamps, xenon lamps and electric arcs. Under the effect of the lighting being required by the nature of the photo-initiator, the thin layer of liquid polymerizes itself quickly which leads to a stoppage of any flow which in turns lead to a production of a rod section being almost perfectly circular (see FIG. 3). This polymerization being created by this manner can also be carried out with the aid of ionizing radiations such as those from an accelerator of electrons or from a radioactive source of gamma rays, such as cobalt 60, for example.

This envelope or sheath is sufficiently solid so that the rod may take support on a roller (not shown) and a fortiori on other subsequent optional support points (not shown). This support enables to avoid that the hardening of the resin would occur in a situation where the rod would be in a curved configuration due to its weight, as is the case with conventional processes without spinneret.

The bundle covered in sand is, always under the effect of traction, pulled into an oven (12) where the temperature and the stay time are adjusted so as to obtain a sufficient degree of polymerization. The traction device or mechanism (4) expulses a continuous and rigid rod that is later cut into pieces according to needs.

The method proposed enables to produce rods that have a high geometrical precision as well as a high percentage level of fibres. To demonstrate the alleged advantages, a series of rods having diameters of 6, 10, 13, 16, 19 and 25 mm have been produced with the aid of the process without spinneret as used currently in the industry, rods of same dimensions have also been produced with the aid of the process described by the present invention, and with the aid of pultrusion with spinneret. These rods are, in the graphs (see FIG. 3 and see FIG. 4) respectively identified by the labels, "actual", "invention" and "pultrusion".

Figure 3:
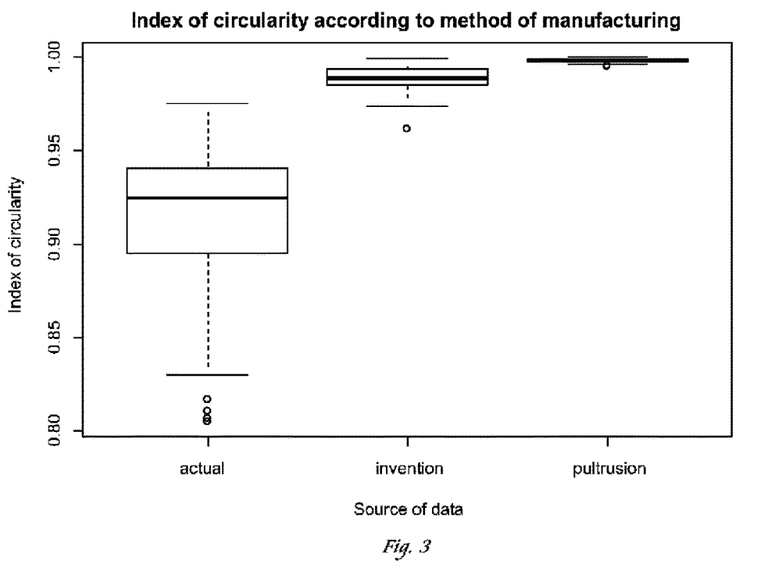
FIG. 3 shows the differences in the circularity of the sections of the rods produced according to the actual method that takes place in the industry, the method proposed by the present invention, and the method which uses the classical process of pultrusion provided with a spinneret.

FIG. 3 shows the value of the index of circularity as well as the dispersion of the values measured for the rods produced with the aid of the aforementioned three processes.

The index of circularity Ic, has been established by measuring with the aid of a micrometer the greatest diameter and the smallest diameter. The index of circularity is defined as follows:

$$Ic = 1 - \frac{(diamètre_{max} - diamètre_{min})}{diamètre_{moyen}} \text{ ou,}$$

$$diamètre_{moyen} = \frac{diamètre_{max} + diamètre_{min}}{2}$$

When Ic=1, then the cross-sectional profile of the rod is perfectly circular and when the index is Ic<1, then its cross-sectional profile is oval.

FIG. 4 shows the proportion of glass fibers for the rods produced according to the aforementioned three processes. The percentage of glass fiber is obtained by a gravimetric method that compares the mass of the original rod to the mass of glass fiber that remains after the resin has been eliminated from a calcination in an oven at high temperature.

The percentage of fiber that is contained in a rod, in the present case of glass fibers is in relation to the mechanical resistance of the rod. Indeed, the greater the percentage of fiber, the greater the fiber is resistant because the effect of the resin is negligible. It is also important to note that a small quantity of resin is associated to an economical use of materials.

FIGS. 3 and 4 are graphs of type "Tukey box" that enable to see quickly the dispersion of values measured at the 25, 50 and 75 centiles of the values measured.

The visual inspection of the graph of FIG. 3 enables to note that the method proposed by this invention (identified by the label "invention") presents a value of circularity which is much higher than what is possible with the actual art (identified by the label "actual"). This value is much closer to what can be obtained with the aid of the method that uses a spinneret (identified by the label "pultrusion").

The inspection of the graph of FIG. 4 shows percentages of glass that are given by the rods produced with the aid of the above-described three processes. The percentage obtained by the means of the invention are similar to what is obtained with the aid of the method of pultrusion. The values associated to the "actual" method show a typical value significantly smaller and a higher variability.

Furthermore, and contrary to conventional methods that use "big" threads and "low" frequencies, the present method advantageously enables to get much closer to a circularity value of 1, thanks namely to the fact that "thin" threads being "under tension" are employed, as well as "high" frequencies. Combined to the various important and different other innovating aspects discussed previously, this enables to have a resulting product that is a reinforcement rod having an excellent mechanical resistance, with a high geometrical (ex. circularity, etc.) precision and that is produced with the aid of a process operable at high output, that does not require expensive spinnerets and that generates a minimum of volatile organic materials.

Although the present invention has been explained hereinabove by means of possible preferred embodiments, it is to be understood that any change to these preferred embodiments is not considered altering the nature and the scope of the present invention. Indeed, any eventual claim should not be limited in its scope of the preferred embodiments illustrated in the examples, and should be given the broadest interpretation consistent with the description as a whole.

Consequently, the scope of the claims should not be limited by the possible embodiments set forth in the examples, but should be given the broadest interpretation consistent with the description as a whole.

The invention claimed is:

1. A method for producing a reinforcement bar by a modified process of pultrusion, the method comprising the steps of:
   a) providing a bundle of filaments being impregnated with a curable resin;
   b) removing excess curable resin from the bundle of filaments;
   c) forming an outer layer of curable resin at a surface of the bundle of filaments, the step of forming the outer layer of curable resin comprising the step of compressing the bundle of filaments in a radial manner, and the step of
   exposing the outer layer of curable resin to a source of radiant energy;
   d) projecting particles onto the outer layer of curable resin; and
   e) allowing a polymerization of the outer layer of curable resin.

2. The method for producing a reinforcement bar according to claim 1, wherein step a) includes the steps of providing spools of filaments, unwinding said spools of filaments, assembling the filaments into the bundle of filaments, and impregnating the bundle of filaments with the curable resin.

3. The method for producing a reinforcement bar according to claim 2, wherein impregnating the bundle of filaments with the curable resin includes pulling the bundle of filaments by traction into a resin bin, and saturating the bundle with the curable resin by capillary absorption.

4. The method for producing a reinforcement bar according to claim 1, wherein step b) includes passing the bundle of filaments through
   constrictor rings disposed in a sequential manner, each of the constrictor rings having a different diameter so as to decrease a diameter of the bundle of filaments via passage of each of the constrictor rings to remove the excess curable resin.

5. The method for producing a reinforcement bar according to claim 1, wherein the step of compressing the bundle of filaments in a radial manner includes compressing the bundle in a centripetal manner.

6. The method for producing a reinforcement bar according to claim 1, wherein the curable resin comprises a calorific additive, the calorific additive being capable of generating heat when exposed to a field of radio waves.

7. The method for producing a reinforcement bar according to claim 6, wherein step c) further includes the step of exposing the bundle of filaments to a
   field of radio waves, the frequency of the radio waves being located between about 1 MHZ and about 18 000 MHZ.

8. The method for producing a reinforcement bar according to claim 1, wherein the curable resin comprises a photo-initiator additive.

9. The method for producing a reinforcement bar according to claim 8, wherein step e) further includes the step of exposing the outer layer of curable resin to a luminous radiation by means of a source of lighting, the luminous radiation having a given wavelength for triggering a reaction of the photo-initiator additive of the curable resin.

10. A reinforcement bar produced according to the method of claim 1.

11. The method for producing a reinforcement bar according to claim 1, wherein the bundle of filaments are filaments of continuous fibers, and wherein the filaments are selected from the group consisting of glass fibers, ceramic fibers, basalt fibers, carbon fibers, fibers of metal and of polymers of aramid type or polyester.

12. The method for producing a reinforcement bar according to claim 1, wherein the curable resin is a thermosetting resin.

13. The method for producing a reinforcement bar according to claim 12, wherein step c) includes exposing the outer layer of thermosetting resin to a dielectric heating.

14. The method for producing a reinforcement bar according to claim 1, wherein step c) includes the step of sheathing the bundle of filaments with at least one thread under tension.

15. The method for producing a reinforcement bar according to claim 14, wherein the at least one thread is an elastic thread.

16. The method for producing a reinforcement bar according to claim 1, wherein step c) includes the step of sheathing the bundle of filaments with at least one pair of threads under tension, and wherein the threads of the at least one pair of threads are wound in a spiral about a longitudinal axis of the bundle of filaments, with at least one of the threads being wound in a dextral direction and another one of the threads being wound in a sinistral direction.

17. The method for producing a reinforcement bar according to claim 16, wherein each of the at least one pair of threads is a 60 denier nylon monofilament.

18. The method for producing a reinforcement bar according to claim 17, wherein the 60 denier nylon monofilament is capable of deforming itself elastically by an approximate value of at least 5%.

19. The method for producing a reinforcement bar according to claim 16, wherein the at least one pair of threads correspond to bands being of porous nature configured to migrate the curable resin to the surface of the bundle of filaments.

20. A system for producing a reinforcement bar by a modified process of pultrusion, the system comprising:
    a device for receiving a bundle of filaments being impregnated with a curable resin and removing excess curable resin from the bundle of filaments;
    a device for compressing the bundle of filaments in a radial manner;
    a device for exposing the bundle of filaments to a source of radiant energy, wherein the device for compressing the bundle of filaments in a radial manner and the device for exposing the bundle of filaments to a source of radiant energy are configured to cooperatively form an outer layer of curable resin at a surface of the bundle;
    a device for projecting particles onto the outer layer of curable resin; and
    a device for allowing a polymerization of the outer layer of curable resin.

* * * * *